Dec. 9, 1969　　　　　　　　G. C. FENN　　　　　　　3,482,583
AUTOMATIC APPARATUS FOR CLEANING KEG FITTINGS OF TAPPING SYSTEMS
Filed Feb. 19, 1968　　　　　　　　　　　　　　　　6 Sheets-Sheet 1
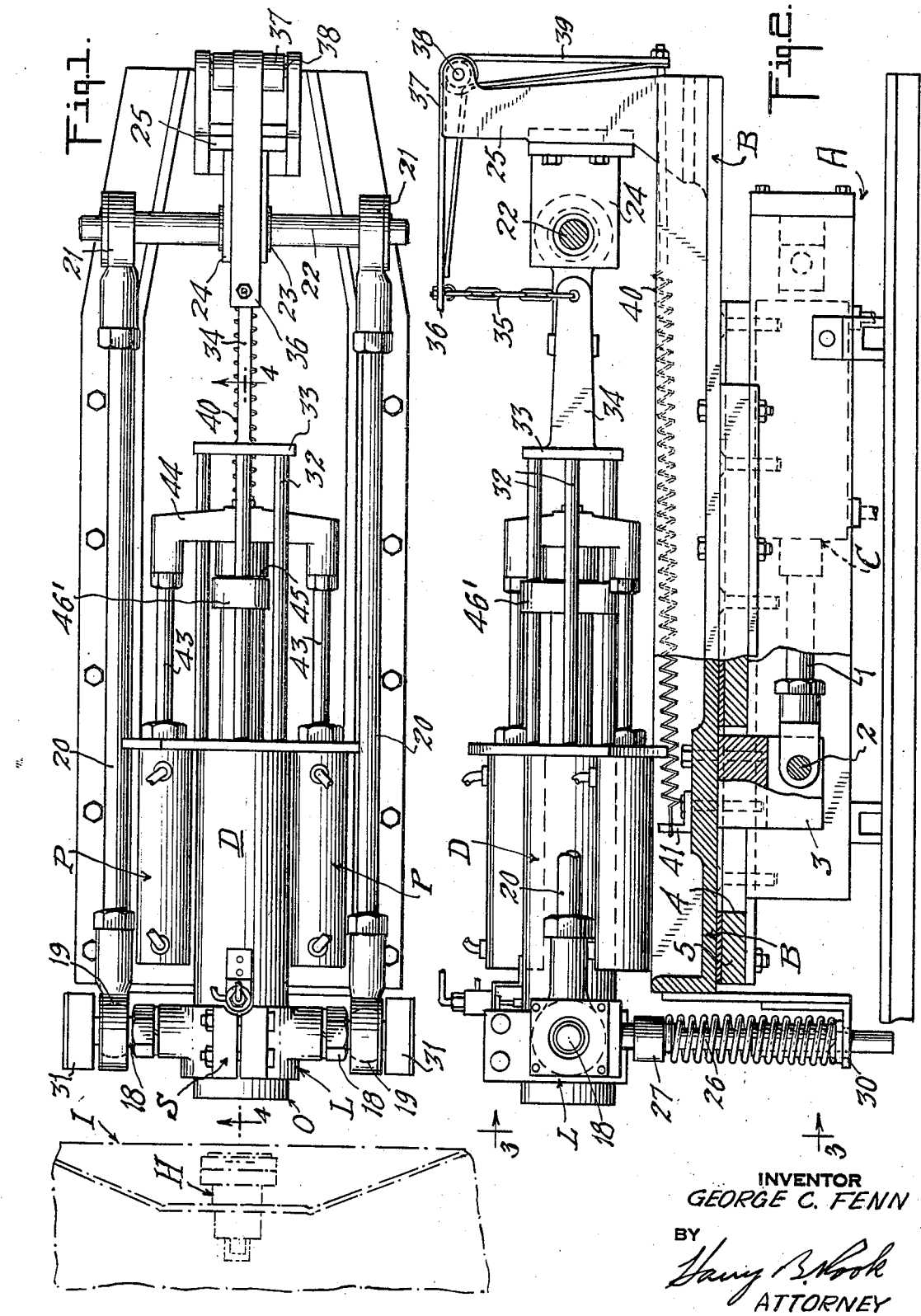
INVENTOR
GEORGE C. FENN
BY
ATTORNEY

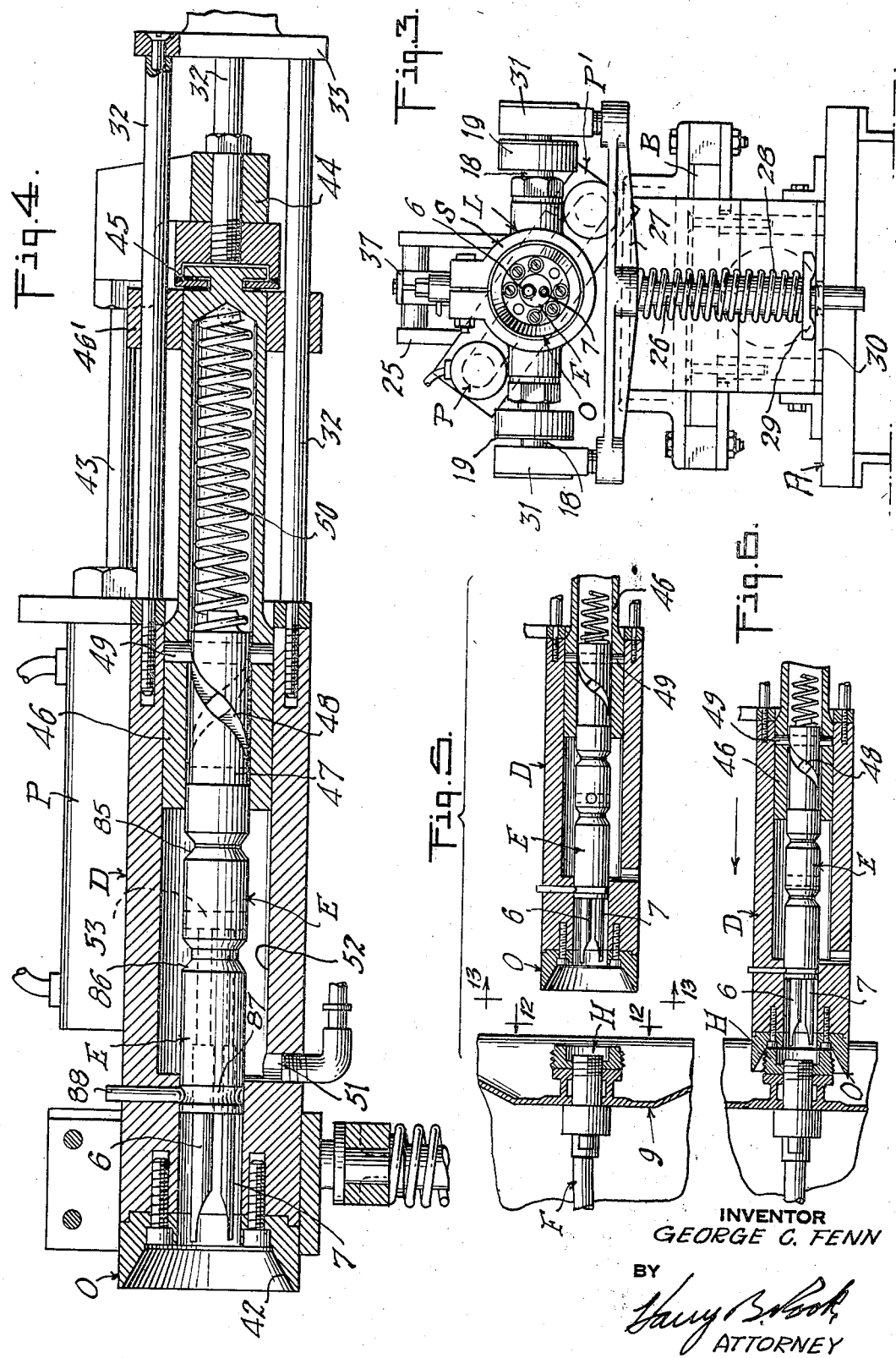

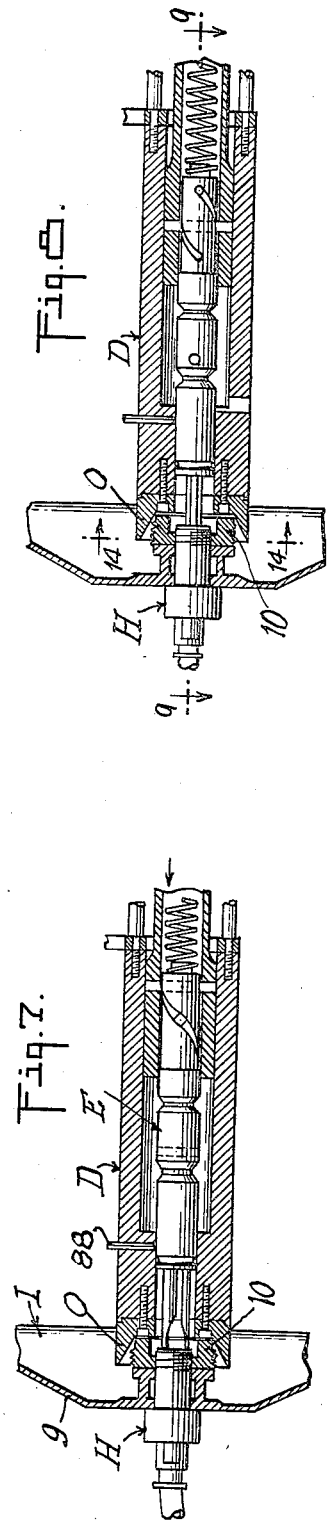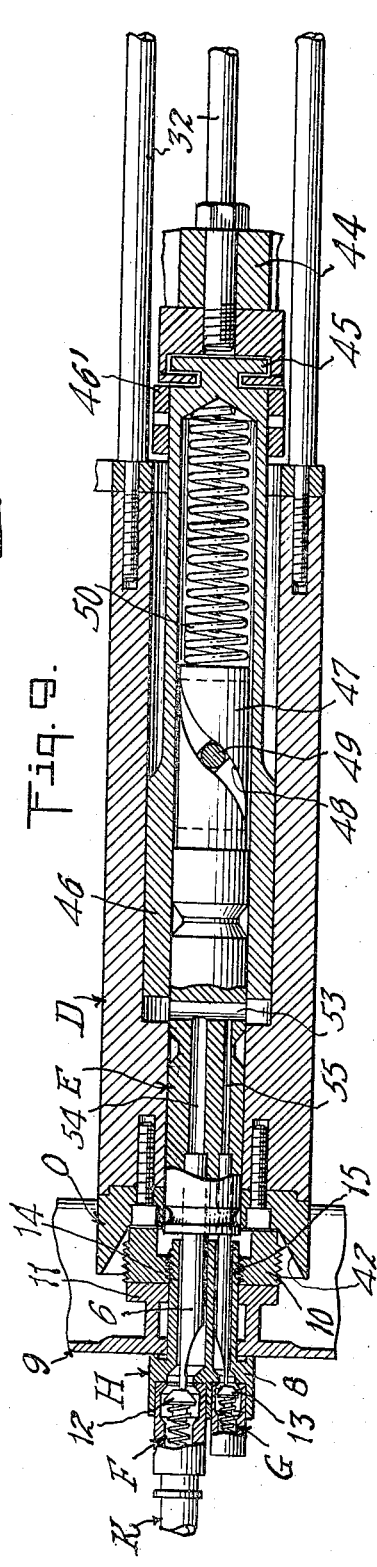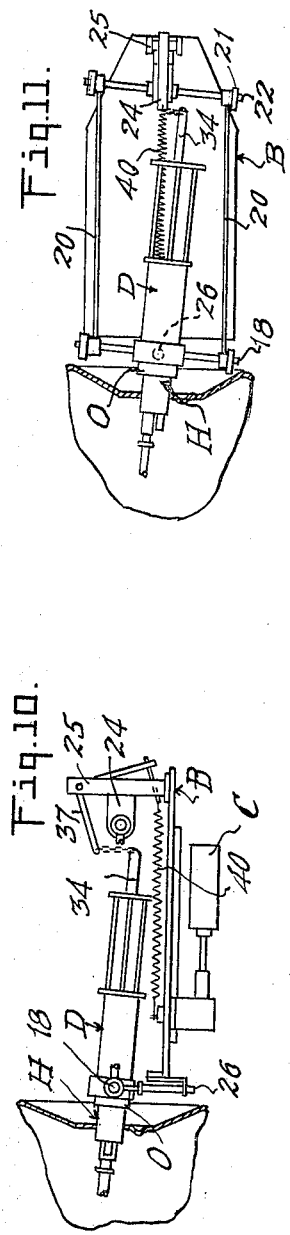

Dec. 9, 1969   G. C. FENN   3,482,583
AUTOMATIC APPARATUS FOR CLEANING KEG FITTINGS OF TAPPING SYSTEMS
Filed Feb. 19, 1968   6 Sheets-Sheet 4
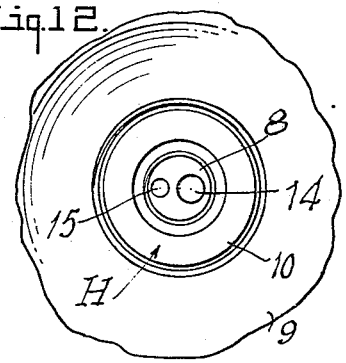
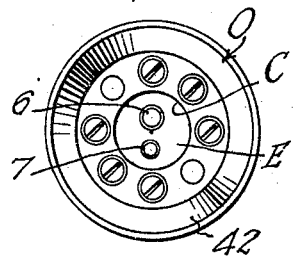
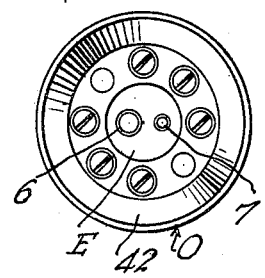
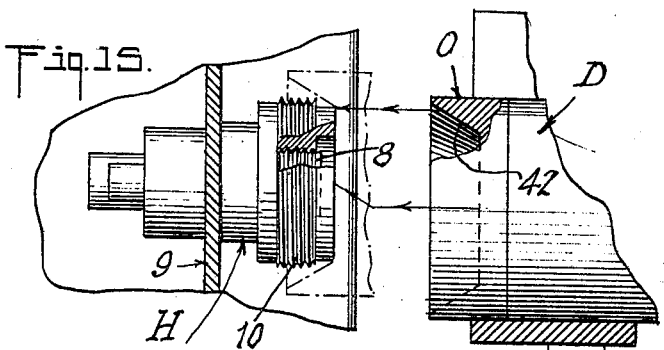
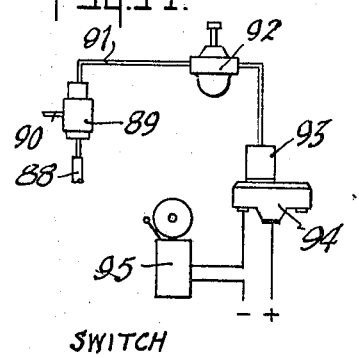
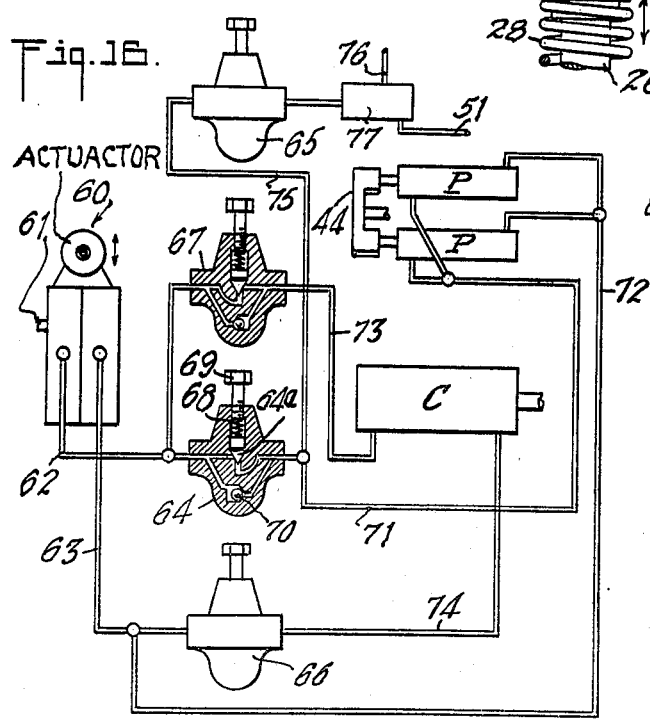
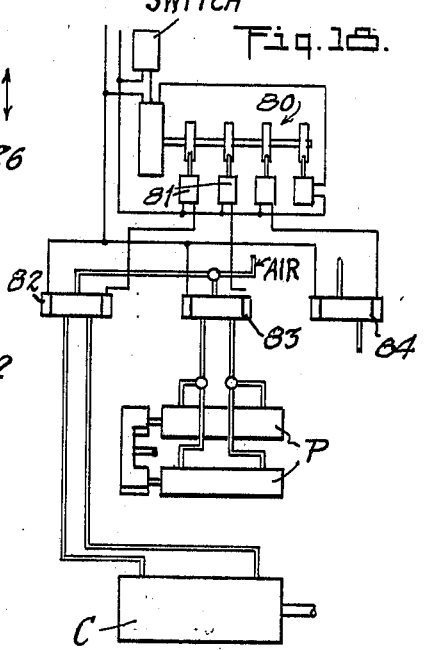
INVENTOR.
GEORGE C. FENN
BY
ATTORNEY

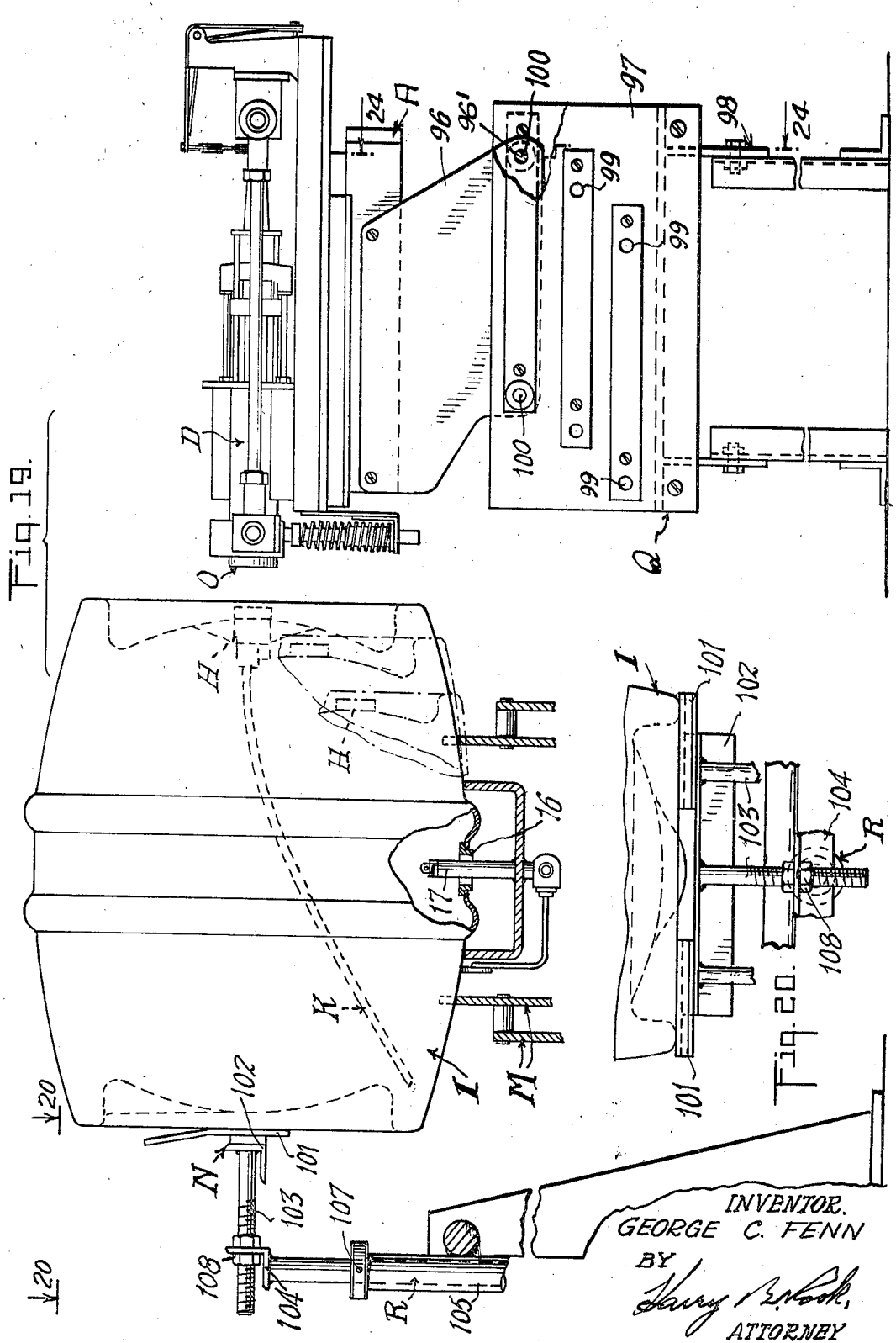

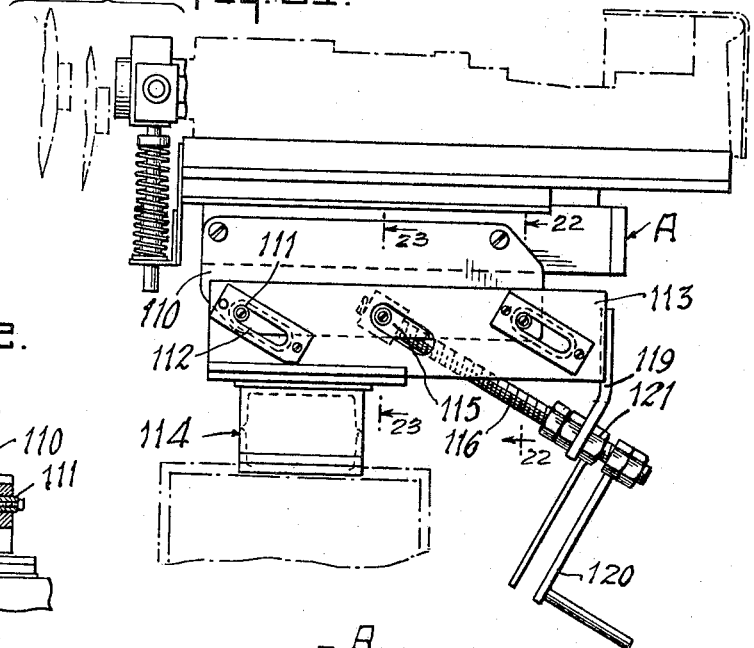
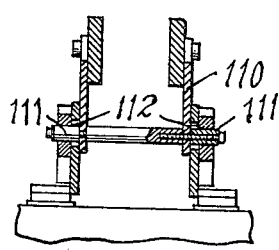
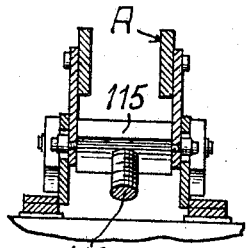
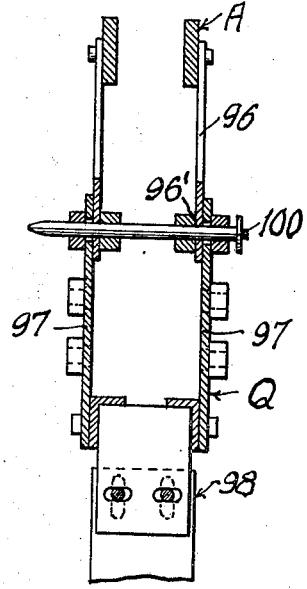
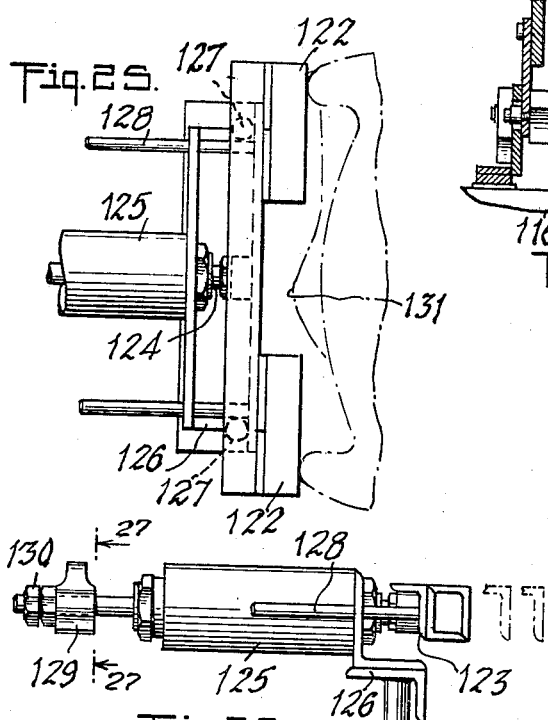
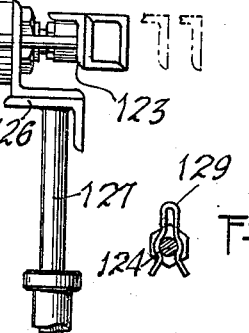

United States Patent Office 3,482,583
Patented Dec. 9, 1969

3,482,583
AUTOMATIC APPARATUS FOR CLEANING KEG FITTINGS OF TAPPING SYSTEMS
George C. Fenn, Wayne, N.J.
(118 Pier Lane, Fairfield, N.J. 07006)
Filed Feb. 19, 1968, Ser. No. 706,381
Int. Cl. B08b 3/04, 9/02
U.S. Cl. 134—43                                      10 Claims

ABSTRACT OF THE DISCLOSURE

A cylinder having a slidable and rotatable nozzle therein, is mounted in a vertically and horizontally adjustable carriage and is linearly actuated toward and away from a tapping system fitting secured in a keg that is held in predetermined position. The nozzle has at one end tubular probes to open spring-closed air and liquid valves in the fitting, and the cylinder is swingable automatically in both horizontal and vertical planes upon engagement with the fitting of a flared pilot element on the cylinder so as to align the nozzle probes with the valves even when the fitting has become dislocated from its normal angular relation to the keg. Means actuated in timed relation to movement of the nozzle controls supply of cleaning liquid through the probes into the keg, and mechanism controlled by the nozzle signals failure of the probes to enter the fitting because of either misalignment of the probes or the absence from said predetermined position of said keg.

BACKGROUND OF THE INVENTION

Field of the invention

The invention is related to the washing of beer kegs and particularly to the cleaning of keg fittings of tapping systems.

Description of the prior art

A hand-operated valved casing connected to a hose for washing liquid, has tubular probes to open the spring-closed air and liquid valves when the casing is manipulated to manually press the probes against the valves of, for example, a tapping system keg fitting shown in Patent No. 3,228,413. This operation is slow and the operator is required to exert a great amount of physical energy in handling the apparatus and in pushing the valves open against the resistance of the springs.

SUMMARY OF THE INVENTION

One object of the present invention is to provide automatic apparatus by which the keg fitting of the type above-described, can be cleaned quickly and with a minimum of effort by an operator, and which includes a nozzle having valve-opening probes and novel means for actuating it successively to move the probes into alignment with said spring-closed valves and then to open the valves, and direct washing liquid therethrough.

The invention also contemplates the association of the automatic apparatus with a keg washing machine in which the kegs are moved in succession to a washing station over a spraying nozzle, so that the tapping system fittings can be washed in succession as the respective kegs reach said station.

Due to rough handling of the kegs, the fittings frequently become dislocated from their normal angular relation to the kegs, and therefore the invention contemplates novel means for automatically aligning the probes of the nozzle with the valves of the fitting, and to accomplish this result even when the fitting is dislocated.

The invention also provides automatic means to control the supply of the washing liquid to the fitting in timed relation to the movement of the nozzle probes into engagement with said valves.

Also provided by the invention is mechanism controlled by the nozzle to signal malfunction, e.g., when the probes enter the fitting only partially or not at all, or the probes become jammed in the fitting.

The invention also contemplates novel means for adapting the apparatus to use with different types of keg washing machines and for cleaning the fittings in kegs of different lengths and different diameters.

A BRIEF DESCRIPTION OF THE DRAWINGS

The present invention may be better understood and its numerous advantages will become apparent to those skilled in the art by reference to the accompanying drawings wherein corresponding and like parts are referred to by the same reference characters and in which:

FIGURE 1 is a top plan view of apparatus embodying the invention disposed in normal at rest condition in juxtaposition to the end of a keg which is indicated by dot and dash lines;

FIGURE 2 is a side elevation of the apparatus;

FIGURE 3 is an end elevation of the apparatus viewed from the plane of the line 3—3 of FIGURE 2;

FIGURE 4 is an enlarged fragmentary vertical sectional view approximately on the plane of the line 4—4 of FIGURE 1;

FIGURE 5 is a fragmentary central vertical sectional view showing the apparatus in at rest position in juxtaposition to the end of a keg;

FIGURE 6 is a similar view showing the cylinder moved into contact with the keg fitting;

FIGURE 7 is a view similar to FIGURE 6 showing the movement of the nozzle and probes relative to the cylinder into contact with the keg fitting;

FIGURE 8 is a view like FIGURE 7 showing the nozzle and probes rotated through a 90° angle just prior to entry of the probes into the valve openings of the keg fitting;

FIGURE 9 is a longitudinal vertical sectional view on the plane of the line 9—9 of FIGURE 8 but showing the probes in contact with and opening the valve in the keg fitting;

FIGURE 10 is a schematic side elevation of the apparatus showing the cylinder swung into position to engage a vertically dislocated keg fitting;

FIGURE 11 is a schematic top plan view of the apparatus showing the cylinder swung to engage a horizontally dislocated keg fitting;

FIGURE 12 is a fragmentary end elevation of the keg fitting and a portion of the end wall of a keg viewed from the plane of line 12—12 of FIGURE 5;

FIGURE 13 is an end elevation of the cylinder and nozzle in their normal at rest position, viewed from the plane of the line 13—13 of FIGURE 5;

FIGURE 14 is a similar view taken from the plane of the line 14—14 of FIGURE 8;

FIGURE 15 is a composite side elevation and section of the keg fitting and the flared pilot element on the cylinder, showing the manner in which the pilot element guides the cylinder into proper alignment with the keg fitting;

FIGURE 16 is a schematic composite elevation and sectional view of a pneumatic control system for controlling the linear movement of the cylinder and nozzle;

FIGURE 17 is a schematic elevational view of the signal system;

FIGURE 18 is a similar view of an electrical control mechanism for the pneumatic motors;

FIGURE 19 is a side elevational view of a cylinder, its supporting carriage and base plate, and mounting means for adjustably mounting the end of the cylinder relative to the keg fittings in kegs of different diameters one of which is shown by solid lines on a portion of a keg washing machine which is shown in vertical section;

FIGURE 20 is a fragmentary plan view of the keg or barrel stop or back-up device taken from the plane of the line 20—20 of FIGURE 19 and turned 90° on the sheet;

FIGURE 21 is a view similar to FIGURE 19, but omitting the keg and showing another form of mounting means;

FIGURE 22 is a fragmentary vertical sectional view on the plane of the line 22—22 of FIGURE 21 with portions omitted for clearness in illustration;

FIGURE 23 is a similar view on the plane of the line 23—23 of FIGURE 21;

FIGURE 24 is a transverse vertical sectional view on the plane of the line 24—24 of FIGURE 19;

FIGURE 25 is a fragmentary plan view similar to FIGURE 20 showing another form of the back stop device with portions broken away;

FIGURE 26 is a side elevation of the device shown in FIGURE 25, and

FIGURE 27 is a sectional view approximately on the plane of the line 27—27 of FIGURE 26.

BRIEF DESCRIPTION OF THE PREFERRED EMBODIMENT

Specifically describing the invention and with particular reference to FIGURES 1 through 15, the apparatus includes base A on which is linearly slidably movable a carriage B. As shown, the carriage is actuated by a reciprocating fluid pressure motor C secured on the base and having its piston rod 1 pivotally connected at 2 to a lug 3 secured to the bottom of the carriage and extending through a slot 4 in the top plate 5 of the base.

A cylinder D is mounted on the carriage and has longitudinally coaxially mounted therein a nozzle E which includes at one end thereof tubular probes 6 and 7 through which water is forced into the beer outlet F and the air inlet G of the keg fitting H of a known type of beer-tapping system described in Patent 3,228,413. This keg fitting as best shown in FIGURE 9 includes a shouldered bushing 8 which is secured in an opening in an end wall 9 of a beer keg or barrel I by a clamping nut 10 which is screw threaded on the bushing and abuts a shoulder on the tap bung 11 on the outer side of the keg wall.

The beer outlet F has a normally spring closed valve 12 and the air inlet G has a spring closed valve 13, said valves controlling the flow of beer out of the keg through an opening 14 in the bushing and the valve 13 controlling the flow of air into the keg through an opening 15 in the bushing. The openings or passageways 14 and 15 extend through the end of the bushing and in normal use cooperate with probes of the coupling element of a keg tapping system as shown in said patent. The bushing H is normally applied to the key so that when the side bung 16 of the key I is facing downwardly to receive the nozzle 17 of the keg washing machine, as shown in FIGURE 19, the opening 14 is disposed at the 3 o'clock position and the opening 15 is disposed at the 9 o'clock position as best shown in FIGURE 12.

In accordance with the invention, the probes 6 and 7 of the nozzle are normally disposed at the 12 o'clock and 6 o'clock positions as shown in FIGURE 13. The carriage and cylinder D are normally in the positions shown in FIGURES 1 and 2 with the end of the cylinder spaced from the keg fitting as shown in FIGURE 1, and the nozzle probes are retracted into the cylinder as shown in FIGURES 4 and 5. When it is desired to wash the valves F and G the passages of the keg fitting and the tapping tube K, the carriage is moved to bring the end of the cylinder D into contact with the end of the keg fitting as shown in FIGURE 7 with the probes out of line with the respective passages 14 and 15 of the fitting and in abutting the end of the bushing H, and thereafter the nozzle is rotated until the probes register with their respective passages in the fitting whereupon the nozzle is slid forwardly to push the probes into the passages 14 and 15 in such a way as to open the valves 12 and 13, whereupon wash water is injected through the nozzle and probes, the passages 14 and 15, the valves F and G and the tube K, the water passing into the keg and flowing by gravity therefrom through the side bung 16.

In use of the kegs or barrels, the fittings are sometimes dislocated, for example, by blows accidentally applied to the fittings, and the present invention also contemplates means for automatically lining up the probes 6 and 7 with the openings 14 and 15 of the fitting, even when the fitting is dislocated or deflected as shown for example in FIGURES 10 and 11.

Now preferred means for accomplishing these results are shown in the drawings and it will be seen that one end of the cylinder D is mounted in a crosshead L (FIGURES 1, 2, and 3) which in the present instance is shown as comprising a split spring ring S encircling and clamped on the cylinder and having diametrically opposite pivot arms 18 which have a ball and socket connection 19 with parallel rods 20 which also have ball and socket connections 21 with a shaft 22 which is journalled on the universal joint 23 in a bearing arm 24 that projects from an upstanding bracket 25 on the carriage B. The crosshead L is disposed adjacent the end of the cylinder from which the nozzle is projected and is mounted on a vertical axis 26 which is shown in the form of a vertical rod connected to a yoke 27 centrally of the length of the yoke and normally supported on a spring 28 which bears at opposite ends on the yoke and on a rocking seat plate 29 which bears on a depending bracket 30 suspended from the carriage B (FIGURES 2 and 3). The yoke 27 has bearing blocks 31 in which the arms 18 are supported. Thus the cylinder is adapted to swing about the horizontal axis formed by the arms 18 and about a vertical axis formed by the rod 26 so as to swing about said axes in vertical and horizontal planes respectively. Secured in and extending from the rear end of the cylinder are rods 32 which are connected by a plate 33 from which rearwardly extends an arm 34 which is connected by a flexible connector 35 to one arm 36 of a bellcrank lever 37 pivoted at 38 on the bracket 35 and having its other arm 39 connected to one end of a tension spring 40 the other end of which is connected to a bracket 41 rigidly secured on the carriage B. The spring 40 normally balances the cylinder in its normal position which initially is in line with the keg fitting on a keg that is momentarily stationarly supported on, for example, the washing machine M with the end opposite the fitting abutting a fixed back stop N (FIGURE 19) but said spring may extend or contract to compensate for vertical and horizontal swinging of the cylinder as shown in FIGURES 10 and 11 respectively.

In accordance with the invention as the end of the cylinder approaches the keg fitting, the cylinder is automatically swung into the position in which its axis aligns with the axis of the fitting or so that the probes 6 and 7 are parallel to the passages 14 and 15. To facilitate this action, the leading or forward end of the cylinder has a flared pilot element O which is rigidly secured on the cylinder and has an internal flared surface 42 which engages the edge of the keg fitting as shown in FIGURES 9 and 15 in the latter of which the pilot element is shown in its normal position by solid lines and in its adjusted position on the fitting by dot and dash lines. In FIGURE 10 the fitting is shown as dislocated vertically downwardly and the cylinder is shown as swung in a vertical plane, while in FIGURE 11 the fitting is shown dislocated horizontally and the cylinder is shown as swung in a horizontal plane about the axis of the rod 26.

As herein before indicated, after the end of the cylinder has become seated on the keg fitting, the nozzle is rotated and slid longitudinally forward to cause the probes to enter the openings 14 and 15 of the fitting. The means illustrated for effecting this result is shown as comprising two reciprocating fluid pressure motors P whose cylinders are mounted by plate P' on cylinder D and whose piston rods 43 are connected by a crosshead 44 which has swiveled connection 45 with one end of a hollow actuating sleeve 46 in which is rotatably mounted one end portion 47 of the nozzle which has a helical slot 48 through which passes a pin 49 that is secured in the sleeve 46. A guide block 46' secured on the sleeve slides on rods 33 to prevent rotation of the sleeve. A compression spring 50 is interposed between the end of the portion 47 of the nozzle and the bottom of the recess in the sleeve.

After the pilot element on the end of the cylinder has become seated on the fitting as shown in FIGURE 6, the motors P are energized to actuate the crosshead 44 in the direction to move the sleeve 46 toward the fitting until the ends of the probes contact the end of the bushing as shown in FIGURE 7. Thereupon the sleeve is moved relatively to the nozzle and the pin 40 riding in the helical slot 48 rotates the nozzle so as to bring the probes into axial alignment with the respective openings in the fitting as shown in FIGURE 8. Immediately upon alignment of the probes with said openings, the spring 50 pushes the probes into the openings and the rotation of the nozzle is stopped. At this point, the pin 49 can no longer advance in the slot 48 but will continue to advance and push the nozzle with it so that the probes engage and open the respective valves 12 and 13 in the fitting as shown in FIGURE 9.

At this point the cleaning liquid is injected through the probes, into the openings 14 and 15, past the valves, through the tapping tube K and into the keg from which the liquid will be drained through the side bung 16. For effecting this result, the cylinder is shown as having a cleaning liquid inlet nipple 51 connected to a suitable source of cleansing liquid so that the cleansing liquid flows into a chamber in the cylinder through which the nozzle extends; and the nozzle has a lateral duct 53 which communicates with longitudinal ducts 54 and 55 which lead respectively to the probes 6 and 7 (FIGURE 9). If no keg is located in the predetermined position, the leading end of the sleeve 46 will close the liquid inlet 51 to prevent undesired escape of liquid through the probes.

The invention contemplates different types of control systems for controlling the energization of the fluid pressure motors and the flow of the cleaning liquid in proper timed relation. More particularly, the following operations must take place in the following order and each operation must be fully completed before the next one starts:

(1) Carriage moved toward the keg to square up the nozzle with the fitting.
(2) Probes moved into the fitting.
(3) Cleaning liquid turned on.
(4) Probes fully retracted from the fitting and liquid turned off.
(5) Carriage is returned.

One control system is shown in FIGURE 16. This system includes a main air valve 60 which has an inlet 61 from the source of fluid under pressure and controls the flow of fluid through pipes 62 and 63. The pipe 62 is shown as connected to the inlet of one of four so-called sequence valves 64, 65, 66 and 67. The valve 64 includes a valve element 64a which is normally closed by a spring 68 the compression of which is adjustable by setscrew 69. A bypass between the inlet and outlet of the valve is controlled by a check valve 70 and the outlet of the valve is connected by pipe 71 to one end of each of the motors P the other ends of which are connected by a pipe 72 to the outlet of the valve 66 which is in turn connected to the pipe 63 to the outlet of the main valve.

The pipe 62 is also connected through the valve 67 and pipe 73 to one end of the carriage motor C the other end of which is connected by pipe 74 to the valve 66. The outlet of the valve 64 is also connected by pipe 75 to the valve 65 which admits air to valve 77 to control the supply of cleaning liquid from a supply pipe 76 to the supply nipple 51 connected to the cylinder D.

In operation of the system, when the main valve is operated in one direction the fluid pressure is directed through the pipe 62 and valve 67 to the push-end of the carriage cylinder C. The pressure will not build up to normal in this line until the piston bottoms at the opposite end of the cylinder, at which time the air pressure rises and overcomes the spring in valve 64 so that the pressure then travels through pipe 71 to actuate the pistons of the nozzle actuating motors P. The valve 64 must be set so that the carriage is fully and firmly in its forwardmost position, in contact with the keg fitting, before the probe pistons start to move. The pistons of motors P actuating the nozzle probes will be actuated to their forwardmost position before the fluid pressure overcomes the sequence valve 65 to cause admission of cleaning liquid to the chamber 52 of the cylinder. The valve 65 must be set to turn on the liquid only after the probes have entered the openings in the keg fitting; if the water is turned on too soon, a water lock may occur in the cylinder D. The bleeding passage at the main valve can be set at this time so that the carriage and probes will act quickly but without undue slamming. When the main valve is operated in the opposite direction to release pressure from the pipes 71 and 73 and to feed air pressure through the pipes 72 and 74, the motors P are operated to withdraw the probes from the openings in the keg fitting, and sequence valve 66 opens to direct air through pipe 74 to retract the carriage, the valve 66 being set so that the probes are fully retracted before the carriage is returned.

It will be noted that the valve 67 is installed reversely to the valve 64 so as to trap some air pressure in the return end of the carriage motor cylinder so as to slow down the carriage return.

Another control is shown in FIGURE 18 and comprises a one-revolution electric timer 80 of known construction which actuates in proper sequence microswitches 81 which in turn control solenoid valves 82, 83 and 84 for controlling the flow of fluid under pressure to and from the carriage motor C, the nozzle or probe actuating motors P and the supply of water to the chamber 52 of the cylinder, respectively.

The invention also provides a signal (FIGURES 1, 2 and 17) for indicating the absence of a keg fitting from its predetermined position or the failure of the probes to enter the openings of the fitting. As shown, the nozzle has three circumferential grooves 85, 86 and 87 spaced longitudinally thereof to coact with a pin 88 reciprocable in the cylinder and abuttingly engaging the actuating rod of a known type of valve 89 stationarily mounted by a bracket 89' on the cylinder D. The valve has an air inlet 90 and an outlet 91 which is connected to a flow restricting valve 92 which has a bypass to relieve the pressure and the outlet of which is connected to a piston and cylinder device 93 the piston of which actuates an electric switch 94 and is spring returned. The switch controls a signal bell 95 or other desirable mechanism such as a shutoff device for the barrel washer. As each groove passes the pin 88 during the forward movement of the nozzle, insignificant volume of air is allowed to accumulate in the alarm system; but should the pin remain out of one of the notches for a substantial period of time, the volume of air will increase to a point where it will operate the pilot actuator, that is, the piston and cylinder device 93, which in turn will actuate the switch 94 to cause operation of the signal. The positions of the grooves correspond to normal positions of the nozzle, i.e., when nozzle is retracted, when fitting valves are open, and when nozzle is extended with no keg present.

It is desirable that the apparatus be adaptable to use with kegs or barrels of different diameters or different lengths and therefore the invention contemplates means for adjustably mounting the base A so that the end of the cylinder may be properly related to the keg fitting of any particular keg. FIGURE 19 shows one type of mounting means which includes two spaced and parallel side plates 96 rigidly secured to opposite sides of the base A and adjustably mounted in a support frame Q which is shown as including two spaced and parallel side plates 97 rigidly secured to suitable legs 98. Each plate 96 has an opening 96' at each end thereof in alignment with the corresponding opening in the other plate and the plates are spaced apart so that each thereof may snugly engage the inner surface of one of the support plates 97. Each support plate has a plurality of vertically spaced series of openings 99 and said openings 99 of each series are spaced apart horizontally the same distances as the openings 96' so that locking pins or bolts 100 may be slipped through the registered openings 96' and 99 to mount the cylinder at different elevations to accommodate the keg fittings in kegs of different diameters as indicated by broken lines in FIGURE 19. The series of openings 99 are also preferably horizontally spaced so that the cylinder may be mounted to accommodate kegs of different lengths as also illustrated by the broken lines in FIGURE 19.

Different types of backstop N may also be provided to abut the end of the keg opposite the keg fitting and thereby resist the thrust applied to the keg by the cylinder and the probes. One form of backstop is shown in FIGURE 19 and includes horizontally spaced apart shoeplates 101 mounted on a bar 102 and being spaced apart and of such dimension as to engage the chimes of the kegs as best shown in FIGURE 20. The bar may have connected thereto any desired number of screw threaded rods 103 which are adjustably mounted in a support bracket 104 carried by one or more posts R. Each post includes a main vertical section 105 secured to a suitable support or the frame of the washing machine M, and having telescopically mounted therein an adjustable section 106 that is rigidly connected to the bracket 104. A setscrew or other suitable means 107 is provided for clamping the section 106 in adjustable position and jam nuts 108 are provided on the rods 103 to lock the rods in the bracket 104. The plates 101 are thereby both horizontally and vertically adjustable to properly abut a keg on the washer.

Another mounting means is shown in FIGURES 21 through 24 wherein side plates 110 similar to the plates 96 are connected to the base A and have rollers 111 journalled thereon and running in diagonal parallel slots 112 in support plates 113 which are in turn mounted on a suitable pedestal or frame 114. Between the plates is also privotally mounted a block 115 to which is connected an adjusting screw 116 that is screw threaded at 118 in a bracket 119 rigidly connected to the plates 113. A crank or other suitable means 120 is provided for rotating the screw and it will be observed that upon rotation of the screw the plates 110 will be moved upwardly or downwardly, depending upon the direction of rotation of the screw and the screw may be locked in adjusted position by for example a jam nut 121.

Another modification of the backstop is shown in FIGURES 25, 26 and 27 wherein keg engaging shoes 122 are spaced apart on a bracket bar 123 which is connected centrally of its length to the rod 124 of a piston mounted in a cylinder 125 which is in turn rigidly secured on a bracket bar 126 carried by the adjustable sections 127 of posts similar to the post R. Guide pins 128 are secured to the shoe 123 and slide through the bracket bar 126 to hold the shoe against rotation. The flow of fluid pressure to the cylinder 125 is controlled in timed relation to the movement of the kegs into said predetermined position, and desirably a spring clip spacer 129 may be separably secured to the end of the piston rod opposite the shoe 122 between the end of the cylinder and stop nuts 130 to limit the movement of the shoe toward the end of the keg. Without the clip on the piston rod the stop nuts 130 will limit movement of the shoe to its longest stroke, while the interposition of the spacer clip 129 will shorten the stroke of the shoe to accommodate a longer keg. The space between the shoes 122 on the support bar 123 will compensate for exceptionally large bulges on the bottom of the keg such as indicated by the broken lines 131 in FIGURE 25. This is important where such bulges extend beyond the plane of the chime of the keg, in order to permit the shoes 122 to firmly engage the keg and prevent rocking of the keg.

What I claim is:

1. Cleaning apparatus to coact with a fitting held in a predetermined position and having at least one liquid-receiving opening, said apparatus comprising a base, a nozzle having a tubular probe at one end to enter said opening in the fitting, means mounting said nozzle on said base to swing yieldingly into and out of normal or neutral position about a horizontal axis and a vertical axis and to move linearly alternately in opposite directions toward and from said fitting, said means including a pilot element to engage said fitting upon movement of the nozzle toward the fitting to locate said nozzle and said probe parallel to said opening in the fitting and to cause said probe first to abut said fitting and thereafter to enter said opening in the fitting, said nozzle and probes having passages for cleaning liquid, and there being means actuated in timed relation to the movement of said nozzle for controlling the supply of cleaning liquid through said passages into said opening in the fitting.

2. Cleaning apparatus to coact with a fitting held in a predetermined position and having at least one liquid-receiving opening, said apparatus comprising a base, a carriage and means for linearly moving it on said base alternately in opposite directions, a cylinder having a nozzle longitudinally slidable therein, said nozzle having a tubular probe at one end thereof movable outwardly of one end of the cylinder to enter said opening in said fitting, means mounting said cylinder on said carriage on vertical and horizontal axes adjacent said end of the cylinder to swing in horizontal planes and vertical planes, respectively, including yielding means normally biasing the cylinder into normal or neutral position, said cylinder having a pilot element which upon movement of said carriage in one direction engages said fitting and with said nozzle parallel to said opening in said fitting, means for moving said nozzle during said engagement of said pilot element with said fitting to cause abutment of said probe with said fitting and for thereafter causing the probe to enter said opening in the fitting, said nozzle and probes having passages for cleaning liquid, and there being means actuated in timed relation to the movement of said nozzle for controlling the supply of cleaning liquid through said passages into said opening in the fitting.

3. Cleaning apparatus as defined in claim 1 for said fitting when the fitting projects from an end wall of a keg mounted on a frame and with the addition of support means adjacent said wall, and means mounting said base on said support means for adjustment vertically and horizontally to accommodate kegs of different diameters and kegs of different lengths.

4. Cleaning apparatus as defined in claim 1 for said fitting when the fitting projects from an end wall of a keg mounted on a frame and with the addition of a backstop to abut the opposite end wall of the keg to counter the thrust incident to coaction of the nozzle with said fitting, and adjustable means mounting said backstop for vertical movement and for horizontal movement to abut the end walls of kegs of different lengths and kegs of different diameters.

5. Cleaning apparatus as defined in claim 2, wherein said means for mounting said cylinder on said base includes a yoke rotatable and vertically movable on the base about a vertical axis and having spaced apart bearing blocks, a crosshead on said end of the cylinder having trunnions journaled in said blocks, a bracket on said base adjacent the other end of the cylinder, a shaft having a ball and socket connection intermediate its ends with said bracket, parallel links having their ends connected by universal joints with said trunnions and said shaft, respectively, and the means yieldingly biasing the cylinder into neutral position including a spring supporting said yoke and a spring connected between said bracket and the second-mentioned end of the cylinder.

6. Cleaning apparatus as defined in claim 2, when the fitting has two parallel openings, said nozzle has two probes, one to enter each of said openings, said means for moving the nozzle includes at least one reciprocating fluid pressure motor mounted on said cylinder, a sleeve slidable in said cylinder and connected to the piston rod of said motor, said nozzle being rotatable in said sleeve and having a helical slot and there being a crosspin in said sleeve passing through said slot and spring normally tending to force said nozzle longitudinally, whereby upon engagement of said cylinder with the fitting said sleeve and nozzle are moved longitudinally first to cause abutment of the probes with said fitting and thereafter the nozzle is rotated to align the probes with the openings in the fitting and said spring forces the probes into said openings.

7. Cleaning apparatus as defined in claim 6 when there are spring-closed valves in said openings in the fitting, and after the probes enter said openings said fluid pressure motor continues actuation of said nozzle in the same direction and said probes engage and open said valves.

8. Cleaning apparatus as defined in claim 6 wherein the means for linearly moving the carriage includes a reciprocating fluid pressure motor, and with the addition of means including valves for controlling flow of fluid under pressure to and from said motors in timed relation to each other.

9. Cleaning apparatus as defined in claim 6 wherein said cylinder has an inlet for the cleaning liquid, and said inlet is closed by said sleeve in the event of absence of a fitting from said predetermined position.

10. Cleaning apparatus as defined in claim 6 with the addition of signal mechanism for indicating failure of said probes to enter said openings or the absence of a fitting from said predetermined position, said mechanism including a pin slidably reciprocable in the wall of said cylinder into and out of one or the other of a plurality of circumferential grooves spaced apart longitudinally of said nozzle, and a device controlled by reciprocation of said pin for producing a signal.

References Cited

UNITED STATES PATENTS 3,228,413  1/1966  Stevens _____ 137—322

FOREIGN PATENTS 114,218  5/1899  Germany.
20,855  11/1900  Great Britain.
287,144  2/1965  Netherlands.

ROBERT L. BLEUTGE, Primary Examiner

U.S. Cl. X.R.

134—167